United States Patent [19]

Sandelli

[11] 4,165,349

[45] Aug. 21, 1979

[54] METHOD FOR FABRICATING A RIBBED ELECTRODE SUBSTRATE

[75] Inventor: Gregory J. Sandelli, Newington, Conn.

[73] Assignee: United Technologies Corporation, Hartford, Conn.

[21] Appl. No.: 824,758

[22] Filed: Aug. 15, 1977

[51] Int. Cl.² .................. B29C 25/00; C01B 31/02
[52] U.S. Cl. ................... 264/29.1; 264/129; 423/445; 423/447.2; 423/449
[58] Field of Search ............. 264/29.1, 129; 423/447.1, 447.2, 449, 445

[56] References Cited

U.S. PATENT DOCUMENTS

| | | | |
|---|---|---|---|
| 3,219,731 | 11/1965 | Etzel et al. | 264/29.1 |
| 3,297,490 | 1/1967 | Barber et al. | 264/29.1 |
| 3,346,678 | 10/1967 | Ohlgren | 264/29.1 |
| 3,552,533 | 1/1971 | Graham | 264/29.1 |
| 3,909,298 | 9/1975 | Carr | 136/86 A |

*Primary Examiner*—James H. Derrington
*Attorney, Agent, or Firm*—Stephen E. Revis

[57] ABSTRACT

An economical method for fabricating a porous electrochemical cell substrate having ribs on one side comprises molding the substrate by loading a die of the proper configuration with a predetermined amount of a dry mixture of thermosetting resin and carbon fibers. The mixture is partially cured using heat and low pressure and then is fully cured up to at least 1100° C. to convert all the resin to glassy carbon. The amount of mixture loaded into the die is preselected to yield a finished part having a porosity of at least 75%. Preferably the ribbed substrate is wetproofed in all areas except the ribs which are used to store excess electrolyte during cell operation.

1 Claim, 2 Drawing Figures

METHOD FOR FABRICATING A RIBBED ELECTRODE SUBSTRATE

BACKGROUND OF THE INVENTION

1. Field of the Invention

This invention relates to a method for fabricating a ribbed electrode substrate for use in an electrochemical cell.

2. Description of the Prior Art

A fuel cell is an electrochemical cell. A typical fuel cell is comprised of a matrix material for holding electrolyte and an electrode disposed on each side of the matrix and in contact therewith. Reactant gases are fed to the nonelectrolyte facing sides of each electrode. In a stack of fuel cells separator plates are disposed between adjacent cells. The plates have ribs formed on each side thereof. The ribs abut the electrodes of adjacent cells and form U-shaped channels behind the electrodes. Reactant gas is carried to the electrodes via these channels. FIGS. 1 and 2 of commonly owned U.S. Pat. No. 3,994,748 and FIG. 2 of commonly owned U.S. Pat. No. 3,990,913 show fuel cell stack constructions in accordance with the foregoing description. In FIG. 2 of 3,994,748 it can be seen that each electrode comprises a thin catalyst layer disposed on a somewhat thicker substrate or support layer. The catalyst layer is in direct contact with the matrix and the substrate contacts the separator plate ribs.

It is known in the art that the electrolyte liquid volume varies depending upon the operating mode of the fuel cell. When the fuel cell is of the type which holds its electrolyte trapped within a matrix, provision must be made for accommodating excess electrolyte volume beyond that which the matrix is capable of holding. A well known solution to this problem is the use of what is called a reservoir layer disposed behind one or both of the electrodes. The reservoir layer acts as a sponge to store excess electrolyte. Wicking paths from the matrix through the electrode to the reservoir layer are typically provided to permit transfer of the electrolyte therebetween as the liquid volume increases and decreases. Commonly owned U.S. Pat. Nos. 3,779,811 and 3,905,832 describe this type of approach to handling liquid volume changes in fuel cells.

Separate reservoir layers and ribs in the separator plate are undesirable from both an economic and technical point of view. For example, separator plates are usually made from graphite or a graphite composite and must be gas impermeable; it is expensive putting ribs in such a material. With regard to separate reservoir layers, additional components in a cell package always means increased fabrication and materials costs. Additionally, when separate reservoir layers are used the reactant gas, in order to reach the catalyst layer, must pass through both the partially filled (i.e., with electrolyte) reservoir layer and the electrode substrate. Usually holes or wetproofed areas are required in the reservoir layers to reduce diffusion losses; however, this increases the cost of fabricating the reservoir layers. The thickness of the reservoir layers must also be kept to a minimum for the purpose of reducing these diffusion losses, despite the fact that this restricts the amount of excess electrolyte which can be handled by the cell.

SUMMARY OF THE INVENTION

An object of the present invention is to provide a method for fabricating a novel electrochemical cell electrode substrate, the novel substrate eliminating the need for ribs in the separator plate and for a separate reservoir layer.

More specifically, an object of the present invention is a method for fabricating a ribbed substrate for a fuel cell electrode.

According to the present invention a porous electrochemical cell substrate having ribs on one side thereof is fabricated by loading a die having the mirror image of the rib pattern desired with a predetermined amount of a dry mixture comprising a uniform blend of 20-50% thermosetting resin, by weight, and 80-50% carbon fibers, by weight, the fibers being 10-100 mils in length, partially curing the mixture by the simultaneous application of heat and low pressure, the pressure being applied only to the extent necessary to yield a part having the desired thickness of the substrate, fully curing the pressed part, and heat treating the fully cured part up to at least 1100° C. to convert all of the resin to glassy carbon, wherein the amount of mixture loaded into the die is preselected to yield a finished part having a porosity of at least 75%.

The highly porous ribbed fuel cell substrate made by the method of the present invention can be made into an electrode by applying a catalyst layer to the non-ribbed surface thereof. A flat separator plate can now be disposed between the electrodes of adjacent cells. The ribs of the electrode substrates abut each side of the flat separator plate forming the reactant gas channels. The ribbed substrate, being all carbon, is hydrophilic and excess electrolyte may now be stored therein thus eliminating the need for a separate reservoir layer. The two ribbed substrates with a flat separator disposed therebetween can be made less thick than the total thickness of prior art designs (which use ribbed separators and separate reservoir layers) while having a larger electrolyte storage capacity, as will be hereinafter explained.

Further in accordance with the method of the present invention the molded, heat treated ribbed substrate may, if desired, be wetproofed in virtually all areas except within the ribs such that the webs between ribs remain totally free of electrolyte for easier gas diffusion therethrough. All electrolyte storage will then be within the ribs.

Commonly owned U.S. patent application Ser. No. 824,764, now issued as U.S. Pat. No. 4,115,627, titled ELECTROCHEMICAL CELL COMPRISING A RIBBED ELECTRODE SUBSTRATE by L. Christner and D. Nagle filed on even date herewith discloses and claims subject matter related to this application.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
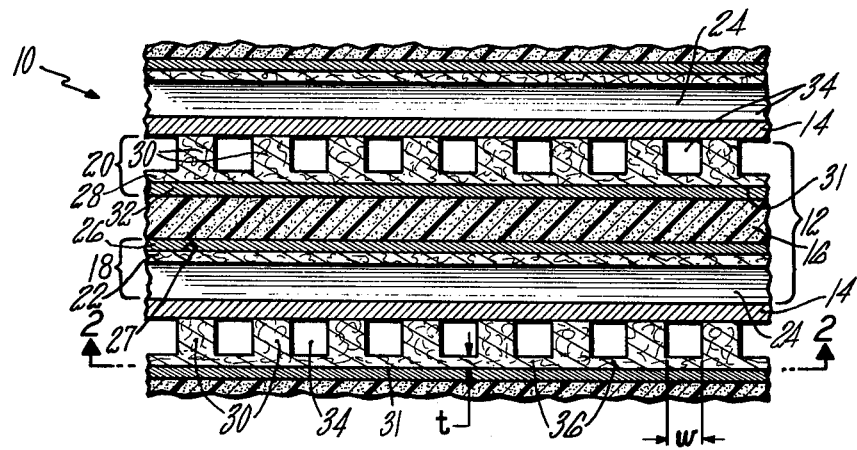
FIG. 1 is a cross section of a fuel cell stack, not to scale.

FIG. 1 is a cross-sectional view of part of a fuel cell stack showing several adjacent fuel cells each incorporating electrodes having the novel substrates which are made by the method of the present invention. The fuel cell stack is generally designated by the numeral 10. Each stack 10 is comprised of a plurality of fuel cells 12 separated by flat separator plates 14. Each cell 12 includes an electrolyte retaining matrix layer 16 having an anode electrode 18 disposed on one side thereof and a cathode electrode 20 disposed on the other side thereof. The anode electrode 18 comprises a substrate 22 having ribs 24 extending thereacross (parallel to the plane of the paper as shown in the drawing) and a catalyst layer 26 disposed on the flat, nonribbed side 27 thereof. The cathode electrode 20 includes a substrate 28 having ribs 30 extending thereacross on one side thereof (perpendicular to the plane of the paper) and a catalyst layer 32 disposed on the nonribbed side 31 thereof. The ribs 24, 30 of the anode and cathode electrode substrates abut the separator plates 14 and form reactant gas channels 34 on each side of the separator plates 14. The ribs 24, 30 of each substrate are separated from each other by webs 36 having a thickness t and a width w. As will be hereinafter explained in further detail, the ribbed substrates 18, 20 of this exemplary embodiment are selectively wetproofed such that, essentially only the ribs 24, 30 remain hydrophilic. Thus, electrolyte storage is essentially only within the ribs.

It should be apparent from the foregoing that the ribbed substrates 18, 20 serve a plurality of functions. First, they may serve as a substrate onto which a catalyst layer may be applied by any known technique. Note, however, it is only necessary that the substrate be in continuous contact with the catalyst layer; thus, the catalyst layer may instead be applied to the surface of the matrix layer 16. Second, the substrate serves as a reservoir for excess electrolyte. Third, the substrate forms channels 34 for carrying reactant gas across the cells. In addition to these functions, the reactant gas within the channels must be able to diffuse readily through the substrate to reach essentially all portions of the catalyst layer.

In view of these requirements the method for making the ribbed substrate must result in a highly porous body, preferably at least 75% porous. Uniformity of the structure is also essential in order that the reactant is distributed uniformly over all of the catalyst layer. Most if not all of the pores should be larger than the pores of the matrix so that essentially only excess electrolyte will enter the substrate and be returned when needed. The substrate must be strong enough to withstand compressive stresses imposed by the stack construction. Also, it must be made relatively inexpensively and to close dimensional tolerances. Finally, it must be virtually inert to the electrolyte used in the cell at the operating conditions of the cell.

In the method of the present invention the ribbed substrate is made from a mixture of thermosetting resin and carbon fibers. The mixture is loaded into a molding die having the mirror image of the rib pattern desired in the substrate. To obtain a substrate having the hereinbefore discussed characteristics, a uniform, dry mixture comprising 20–50% thermosetting resin, by weight, and 80–50% carbon fibers, by weight, must be used. We prefer a phenolic resin in view of its low cost and relatively low molding temperatures. Much less than 20% resin may not provide the part with sufficient strength to withstand the stresses which are imposed on it during operation within a stack; however, in order to obtain high porosity a high fiber content is required. Since high porosity is essential, we prefer to use the maximum amount of fiber (i.e., 80%) and the minimum amount of resin (i.e., 20%).

Fiber length is also critical. If the fibers are too short it is difficult to obtain adequate porosity. Fibers which are too long tend to form clumps or aggregates in the mold; the strength of the finished part is reduced as a result thereof because it becomes very difficult if not impossible to obtain a good distribution of the molding mixture in the die. Blending the fibers and resin well, to form a uniform mixture, helps reduce the number and size of fiber aggregates. It is believed that the fiber length will have to be between 10 and 100 mils and preferably less than 50 mils; however, since even the smaller fiber lengths have a tendency to form aggregates if the mixture is poured directly into the die, we have found it desirable to sift the molding mixture into the die through a screen placed over the die.

The amount of mixture put into the die is predetermined so as to yield a part having the desired porosity when the mixture is pressed to a preset thickness. Low pressure and heat are simultaneously applied to the mixture in a manner calculated to obtain the desired thickness of the part and to at least partially cure the resin so that the part will retain its shape and thickness when the pressure is removed. We prefer to use a flat plate punch which is shimmed so that it bottoms out when the desired thickness of the part has been reached. By this technique any pressure high enough to cause the punch to bottom out is sufficient; excess pressure is taken by the shims and not the molding mixture. The temperature of the mixture need be raised only high enough to melt the resin and should not exceed the final cure temperature of the resin unless the molding step is done in an inert atmosphere. If the resin is a phenolic any temperature between 88° C. and 232° C. (200° F. and 450° F.) may be used when molding in an air environment.

The part is then removed from the die and is placed in a curing oven between flat plates to ensure that the part does not warp. The resin is then fully cured. If a phenolic resin is used this may be done by holding the part at 450° F. for one hour.

The part is then carbonized by heat treating in an insert atmosphere to at least 1100° C. to convert all the resin to carbon. Further heat treatment to at least 2100° C. is recommended to assure removal of all impurities (mainly sulfur and copper) and to improve thermal and electrical properties.

At this point the part is all hydrophilic. In accordance with the teachings of commonly owned U.S. patent application Ser. No. 719,877 ELECTROLYTE RESERVOIR FOR A FUEL CELL by P. E. Grevstad filed on Sept. 1, 1976, now U.S. Pat. No. 4,035,551, if the ribbed substrate has a range of pore sizes randomly distributed throughout with substantially no pores smaller than the largest pores of the matrix then there may be no need for any wetproofing of the substrate. Excess electrolyte will randomly distribute itself throughout the substrate including the webs as well as the ribs. In accordance with the teachings of the Grevstad application, adequate gas distribution through the substrate to the catalyst layer will still be obtained even if 60% of the void volume of the substrate is filled with excess electrolyte.

Figure 2:
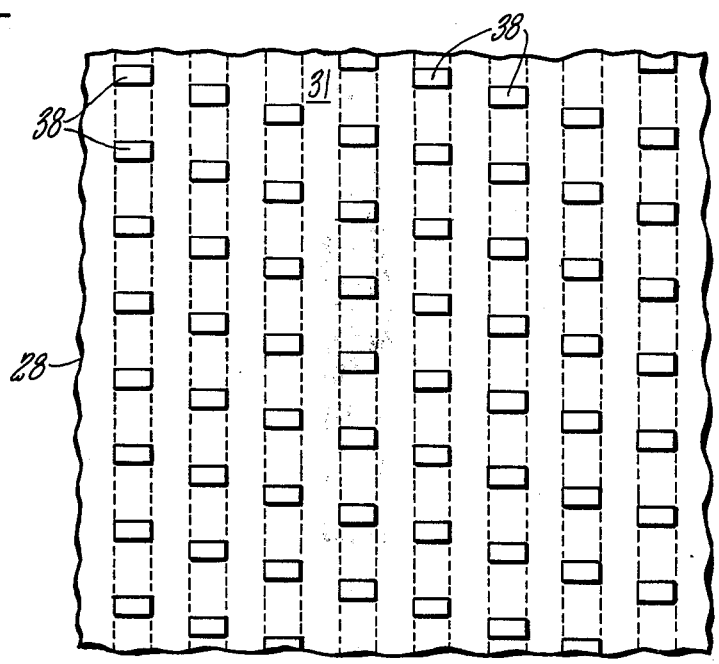
FIG. 2 is a sectional view taken along the line 2—2 of FIG. 1.

In this exemplary embodiment, however, it is preferred to selectively wetproof the substrate to keep diffusion losses to an absolute minimum. FIG. 2 shows the flat catalyst facing surface 31 of the ribbed substrate 28. This surface is impregnated, such as by screen printing, to a depth approximately equal to the thickness t of the webs 36 with an aqueous solution of polytetrafluoroethylene (PTFE) except for select areas 38 which are aligned with the ribs 30. Thus, the ribs 30 remain hydrophilic as well as numerous paths or columns of material under the ribs leading from the surface 31 to the ribs. Although not shown in the drawing, the catalyst layer may (but need not) be provided with holes which are aligned with the areas 38 and which may be filled with hydrophilic material for aiding in the transfer of electrolyte between the matrix and the substrate. After the substrate is impregnated with the wetproofing material it is heated to drive off the inking vehicle and other volatiles which are present in the wetproofing ink.

From the foregoing it is apparent that during fuel cell operation, in this exemplary embodiment, the webs 36 will remain free of electrolyte as well as the large majority of material under the ribs which has also been wetproofed. Thus, electrolyte storage is essentially only in the ribs. Also, since the amount of excess electrolyte relative to the rib volume will usually only partially fill the hydrophilic areas, reactant gas diffusion will occur throughout the void volume of the ribs and throughout the void volume of the hydrophilic areas under the ribs. Thus no area of the catalyst layer will be starved of reactant gas. We have found this to be substantially true even when the hydrophilic areas are 70% filled with electrolyte.

EXAMPLE

A large number of ribbed anode substrates were made according to the present invention having a web width w of 0.094 inch, a web thickness t of 0.015 inch, a rib width of 0.066 inch and a rib height of 0.070 inch. The total thickness of each substrate was thus 0.085 inch which is the sum of the rib height and the web thickness. To fabricate this substrate a molding compound was first prepared comprising 20% by weight of Reichhold 24-655 phenolic resin and 80% by weight carbon fibers purchased from Union Carbide as a Thornel ® mat (grade VMA). Thornel is Union Carbide's trademark for carbonized pitch fibers. Since the carbon fiber was purchased in the form of a mat it was first chopped using a Wiley mill so that the fibers had a nominal length of from 10 to 25 mils. These fibers happened to have a nominal diameter of about 9 microns; however, fiber diameter is not considered critical. The phenolic resin was blended with the chopped carbon fibers in a V-blender for one half hour. The mixture was again passed through the Wiley mill to assure a thorough and uniform blend of the components. An amount of the molding compound sufficient to yield a part having an average porosity of about 80% (density of approximately 1.78 g/cc) was sifted through a 60 mesh screen directly into the die which was at room temperature. A flat plate punch was applied to the mixture using a pressure of 150 psi, and the mold was heated such that the coolest section of the die was at least 134° C. (300° F.). This temperature was held for ten minutes and the pressure was then released. Although 150 psi pressure was applied by the punch, the punch was shimmed so that it would compact the mixture to the desired thickness of 0.085 inch, which means that the molding mixture was not receiving the full 150 psi pressure. The part was removed from the mold and postcured in an inert atmosphere in a dispatch oven at 232° C. (450° F.) for one hour. The temperature was increased at a rate of 50° C. per hour (90° F. per hour) to 815° C. (1500° F.) and was further increased from 815° C. to 1092° C. (2000° F.) as fast as possible and held at 1092° C. for one hour. The part was then allowed to cool (although this was not necessary) and was then further heat treated to 2100° C. (3812° F.). The part had a porosity of approximately 65% in the web areas and 90% in the ribs. The flat side of the substrate was then impregnated with PTFE using a screen printing process and a pattern very similar to that shown in FIG. 2. The total area of the surface which was not impregnated with PTFE amounted to only about 12.5% of the total surface area. The screen printing ink used in this example was comprised of 44% Dupont's TFE-30 (an aqueous suspension of 60% PTFE with a surfactant), 0.3% B. F. Goodrich's Carbopol ® (a thickening agent), 55% water, and 0.2% ammonium hydroxide to gel the Carbopol. (All percentages are by weight.) After impregnation the part was heated to 349° C. (660° F.) for 15 minutes to remove the volatiles and to sinter the PTFE.

The ribbed substrate of the foregoing example has approximately twice the storage capacity (in the ribs) of a continuous 15 mil thick flat 100% hydrophilic reservoir layer of the prior art which is used with a ribbed separator plate. This is true in addition to and despite the fact that a ribbed substrate with a flat separator plate permits the cell to be made somewhat thinner than in the prior art. Note, also, to reach the catalyst layer in the areas of the webs the reactant gas need only diffuse through a 15 mil thickness of material which, in the exemplary embodiment, will contain no electrolyte since the webs are wetproofed. Reactant gas also diffuses readily into the wetproofed areas under the ribs as well as through the void volume of the partially filled (with electrolyte) hydrophilic areas. Therefore, virtually no areas of the catalyst layer are starved of reactant. Theoretically, 100% of the rib volume can be used to store electrolyte with only a minimal performance penalty. We prefer a maximum of 70%.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A method for fabricating a porous one-piece fuel cell electrode substrate having a flat surface on one side and ribs on the other side thereof, said ribs forming U-shaped channels therebetween extending across said substrate, comprising the steps of:

preparing a uniform, dry mixture comprising about 20% phenolic resin, by weight, and about 80% carbon fibers, by weight, the fibers being less than 50 mils in length;

loading a predetermined amount of the mixture into a molding die having the mirror image of the rib pattern desired in the substrate by sifting said mixture into said die through a screen, the amount of mixture being just sufficient to provide the finished part with a preselected porosity of at least 75% after pressing, and distributing the mixture uniformly throughout the die;

simultaneously pressing the mixture in the die to the desired thickness of the substrate and heating the mixture to above the melt point of the resin but to less than the final cure temperature of the resin and holding the pressure and temperature at least until the resin cures to an extent such that it retains its pressed shape after release of the pessure;

fully curing the pressed part;

heat treating the fully cured part up to at least 2100° C. in an inert atmosphere to convert the resin to glassy carbon; and impregnating the entire flat surface of the heat treated part with a wetproofing material except at select locations uniformly distributed under the ribs, said impregnating being to a depth of at least about the thickness of the substrate between the ribs.

* * * * *